Patented Nov. 20, 1934

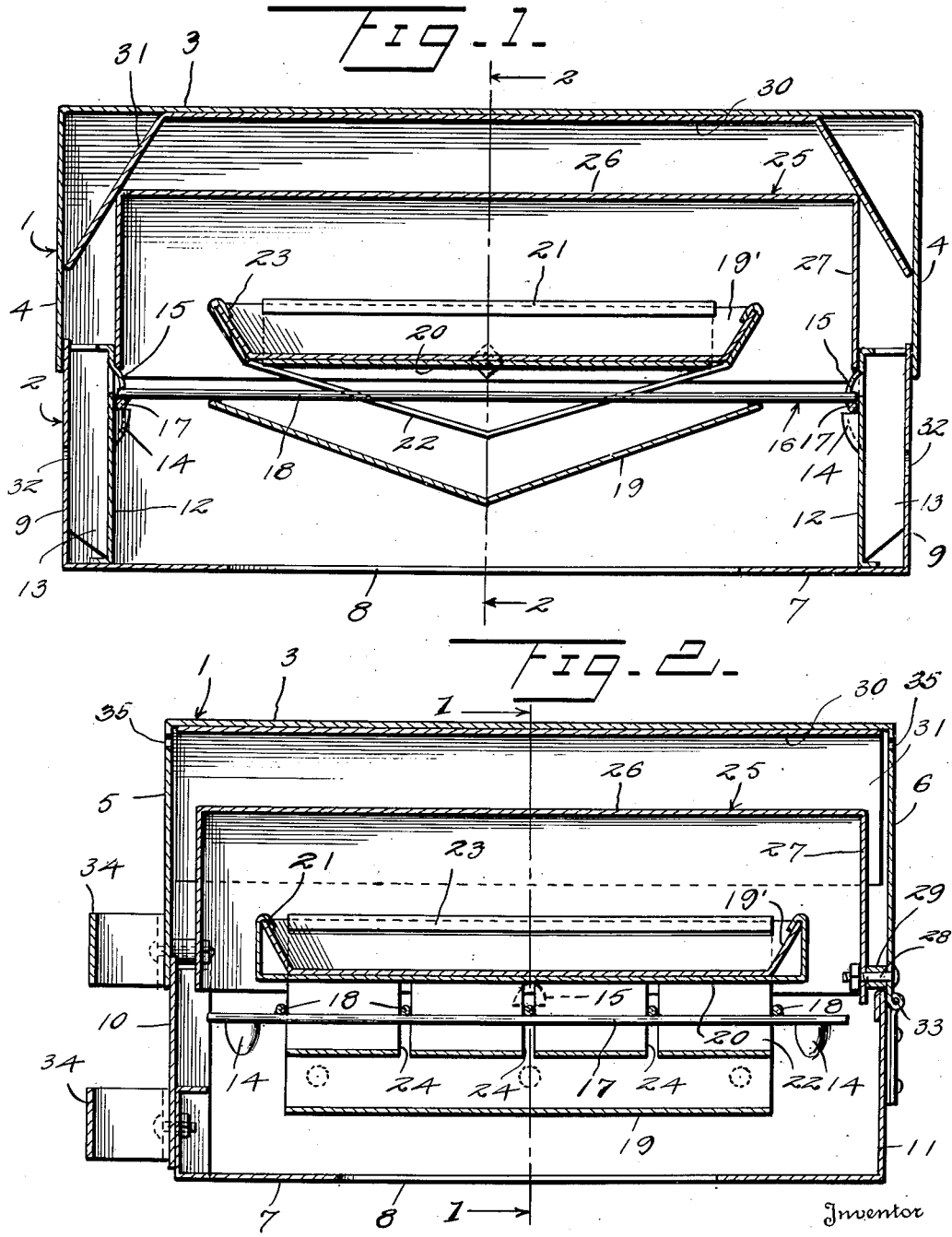

1,981,658

UNITED STATES PATENT OFFICE

1,981,658

OVEN

Jesse H. Mosshammer, Wapanucka, Okla.

Application July 7, 1932, Serial No. 621,293

3 Claims. (Cl. 126—275)

This invention relates to improvements in ovens and pertains particularly to an oven which is designed to be placed upon a stove of any type such as gas or oil or upon the top of a coal or wood range.

The primary object of the present invention is to provide a baking oven having hingedly connected top and bottom portions, in which the top portion is so constructed as to form a chamber separate from the top and designed to overlie the material in the oven to receive the steam rising from the material such as bread, cake or the like and retain it as a blanket over and about the baking body so as to keep the body from drying out.

Another object of the invention is to provide an oven which in addition to maintaining a blanket or envelope of steam about the baking body, is so designed as to prevent smoke or fumes from the underlying heating unit entering the steam filled chamber, thereby preventing the food from taking up any unpleasant odors.

A still further object of the invention is to provide an oven having a novel food supporting grill and novel means for retaining the same in position.

Other objects and advantages of the invention will become apparent as the description of the same proceeds and the invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a vertical sectional view taken transversely of an oven constructed in accordance with the present invention, the section being substantially 1—1 of Figure 2;

Figure 2 is a vertical sectional view taken from the front to the rear through the present oven, substantially upon the line 2—2 of Figure 1.

Referring now more particularly to the drawing wherein like numerals of reference indicate corresponding parts throughout the several views, the numerals 1 and 2 indicate respectively the top and bottom portions of the oven embodying the present invention. These portions are of rectangular design as shown and the top portion, which will hereinafter be referred to as the cover, has a top wall 3 and the four vertical walls, the side ones of which are indicated by the numerals 4, while the front and back ones are indicated respectively by the numerals 5 and 6. The lower part 2 of the oven has a bottom wall 7 through the center of which is a relatively large opening 8 through which heat passes upwardly into the oven and integral with this bottom wall 7 are the upstanding side walls 9 and the front and rear walls 10 and 11 respectively.

As shown in Figure 1 the interior dimensions of the top portion or cover of the oven are greater than the exterior dimensions of the lower or bottom portion so that when the cover is in closed position it will tightly receive the upper edges of the front, back and side walls of the bottom portion so as to form a tight connection therebetween and thus prevent the loss of heat from the oven when the same is in use.

Disposed within the bottom portion 2 are false inner side walls which are indicated by the numeral 12. These false side walls are arranged in spaced parallel relation with the side walls 9 and have inturned flanges 13 at their ends which abut the side walls at their longitudinal edges and have their outer faces disposed against the front and rear wall portions of the bottom section. These flanges thus serve to maintain the false side walls 12 in the proper spaced relation with the walls 9.

The walls 12 are each provided with a pair or more of impressed portions 14 which form supports for use as hereinafter described and disposed between these impressed portions are similar impressed portions 15 which are at a higher elevation than the portions 14 and which have downwardly directed edges, whereas the portions 14 have upwardly directed edges as illustrated in Figure 1.

Disposed within the lower part 2 of the oven is a grid which is indicated as a whole by the numeral 16 and which has side bars 17 which position adjacent the inner surfaces of the false walls 12, and cross bars 18 which connect the side bars 17.

As shown the side bars 17 of the grid rest upon the upwardly directed edges of the impressed supporting portions or elements 14 and they pass beneath the downwardly directed edges of the impressed portions 15, these latter portions operating to maintain the grid in place. Removal of the grid is effected by pressing inwardly against the false walls 12 at their top edges so as to flex the same and thus shift the impressed portions 15 from position over the side bars of the grid, thus releasing the same for removal. The top edges of the walls 12 are free from connection throughout the major portion of their lengths with the adjacent side walls 9.

Secured to the under side of the grid is a downwardly directed angled heat deflector plate 19 which overlies the opening 8 in the bottom of the oven and deflects the heat coming upwardly therethrough to the sides of the oven.

Removably mounted upon the grid 16 is a tray 19' the bottom of which is made of double thickness by placing a plate 20 thereacross as shown, the ends of this plate 20 being brought up across the sides of the tray and bent over the top edges of the sides as indicated at 21.

Connection is made between the tray 19' and the grid upon which it is mounted, by means of a substantially V-shaped plate 22 which extends across the under side of the tray at right angles to the plate 20 and which has its ends extended up over the adjacent sides of the tray and bent over the adjacent top edges thereof as indicated at 23. The lower portion of this plate 22 is provided with longitudinally directed slots 24 in each of which one of the transverse bars 18 of the grid frictionally engages.

It will thus be seen that the tray 19' will be removably held in place upon the grid over the heat deflector.

Disposed within the cover 1 of the oven is an inverted pan-like member which is indicated as a whole by the numeral 25 and which has a top 26 and depending side walls 27. This inverted pan is maintained in spaced relation with the top 3 of the cover and with the front, back and side walls thereof, by means of connecting bolts 28 about which are spacing sleeves 29. These bolts 28 as shown pass through the front and rear walls of the oven cover and connect with the adjacent walls 27 of the pan, and the sleeves 29 thereon maintain these adjacent walls in the proper spaced relation and the bolts also serve to support the pan in place in the cover. The lower edges of the walls 27 of the pan 25 are disposed in the same plane as the lower or bottom edges of the adjacent walls of the cover and the space between the side walls 4 of the cover and the adjacent walls 27 of the pan is of sufficient width to snugly receive the top portions of the side walls 9 of the bottom part of the oven and the adjacent false walls 12. It will thus be seen that the area between the walls 9 and 12 opens upwardly directly into the area between the walls 4 and the adjacent pan walls 27. As previously stated, the top wall 26 of the pan 25 is also spaced from the top wall 3 of the cover and extending across the inner surface of the cover top wall is a plate 30 which has angularly directed side portions 31 which as shown in Figure 1 extend obliquely downwardly across the adjacent corners of the pan 25 and contact with the cover side walls 4.

From the foregoing description it will be readily apparent that when a pan of food is placed in the tray 19' for baking, or is placed upon the grill 16, such for example, as a pan of bread, the top part of the bread will be entirely within the pan 25. As the bread becomes heated moisture will be driven threrefrom in the form of steam and this will rise and collect in the top of the pan which overlies the bread. This will continue until the pan 25 becomes entirely filled with steam and it will thus be seen that the bread will be baked in a bath of steam and it will not, therefore, dry out as would be the case if the steam were allowed to escape.

This body of steam filling the pan 25 will also prevent the entrance into the pan of smoke or odors from the heating structure upon which the oven is placed but will shunt any smoke or odors which may be developed to the front and rear of the oven where they will pass upwardly between the front and rear walls 5 and 6 of the cover and the adjacent pan walls 27 and escape from the oven by way of suitable apertures formed in the top of the cover, such for example, as the apertures 35.

It will also be apparent that by spacing the pan 25 from the top wall 3 and the side walls of the cover a wall of heat is maintained about the sides and over the top of the bread so that all sides will be evenly baked.

The side walls 9 of the bottom portion of the oven are provided with air inlet apertures 32 so that a circulation of air will be maintained in the chamber between the cover and the pan.

The cover or top and bottom of the oven are connected by a hinge 33 which joins the back walls 6 and 11 thereof and the raising of the cover from the bottom is facilitated by the provision of the handles 34.

The plate 30 is provided to take up and assist in retaining heat over and adjacent the sides of the pan 25.

Having thus described the invention, what is claimed is:—

1. An oven comprising a body formed to provide a chamber, an opening in the bottom of said chamber for the entrance of heat directly thereinto from a heating device, means within the chamber for supporting a body to be baked, and means within and spaced from the wall of the chamber adapted to overlie and partially enclose the body supporting means for receiving steam rising from a baking body, the said means being imperforate and retaining the steam as a blanket about the baking body to prevent excessive loss of moisture therefrom.

2. An oven of the character described, comprising a body formed to provide a chamber having an opening in the bottom thereof to permit the entrance of heat directly thereinto from an underlying heating device, means within said chamber for supporting a body to be baked, and a pan-like body within the chamber in the form of a hood having a top and depending side walls and overlying said supporting means with the lower edges of the depending side walls in close proximity thereto whereby a body upon the supporting means will be entirely enclosed and will be baked in an enveloping blanket of steam risen therefrom and retained thereabout by the hood, said hood being in spaced relation with adjacent walls of the chamber.

3. An oven, comprising top and bottom portions hingedly connected together, said bottom portion having an opening in the bottom thereof for admitting heated air directly into the body of the oven, a pair of wall units mounted in and adjacent opposite walls of the bottom portion, each of said wall units having a series of struck-out portions extending transversely thereof adjacent the top edge, said struck-out portions forming upwardly directed shoulders, a struck-out portion forming a portion of each of said walls above the shoulders and extending inwardly and downwardly in opposed relation to the shoulders, and a food supporting grill having a pair of side bars each of which rests upon the shoulders of a wall and is resiliently held thereagainst by the overlying struck-out portions.

JESSE H. MOSSHAMMER.